US007237185B1

(12) United States Patent
Sequeira

(10) Patent No.: US 7,237,185 B1
(45) Date of Patent: Jun. 26, 2007

(54) SYSTEM AND METHOD FOR DISTRIBUTING INTERNET CONTENT IN THE FORM OF AN ALBUM

(75) Inventor: William J. Sequeira, Oakland, CA (US)

(73) Assignee: Corporate Media Partners, Burbank, CA (US)

( * ) Notice: Subject to any disclaimer, the term of this patent is extended or adjusted under 35 U.S.C. 154(b) by 0 days.

(21) Appl. No.: 09/394,165

(22) Filed: Sep. 13, 1999

(51) Int. Cl.
*G06F 17/00* (2006.01)

(52) U.S. Cl. .................................. 715/500.1; 715/523

(58) Field of Classification Search ................ 707/513, 707/501.1; 715/513, 501.1, 523, 500.1; 725/44, 725/48
See application file for complete search history.

(56) References Cited

U.S. PATENT DOCUMENTS

| 5,027,400 | A |   | 6/1991  | Baji et al. ...................... 380/20     |
| 5,099,319 | A |   | 3/1992  | Esch et al. ...................... 358/86    |
| 5,408,448 | A | * | 4/1995  | Carman ................... 369/178.01         |
| 5,440,401 | A |   | 8/1995  | Parulski et al. .............. 358/342        |
| 5,477,264 | A | * | 12/1995 | Sarbadhikari et al. ... 348/231.6             |
| 5,499,046 | A |   | 3/1996  | Schiller et al. ................ 348/6        |
| 5,583,937 | A |   | 12/1996 | Ulrich et al. .................. 380/20       |
| 5,659,350 | A |   | 8/1997  | Hendricks et al.                              |
| 5,712,995 | A | * | 1/1998  | Cohn .......................... 345/792       |
| 5,745,909 | A | * | 4/1998  | Perlman et al. .............. 715/513         |
| 5,768,435 | A |   | 6/1998  | Murray ........................ 382/243       |
| 5,802,299 | A | * | 9/1998  | Logan et al. ................ 709/218         |
| 5,815,657 | A |   | 9/1998  | Williams et al. ............. 395/186         |
| 5,844,570 | A |   | 12/1998 | Curtright et al. ........... 345/435          |
| 5,850,218 | A |   | 12/1998 | LaJoie et al. ................ 345/327        |
| 5,930,808 | A |   | 7/1999  | Yamanaka et al. .......... 707/501            |
| 5,963,966 | A |   | 10/1999 | Mitchell et al. ............. 707/513         |
| 6,032,130 | A | * | 2/2000  | Alloul et al. .................. 705/27       |
| 6,097,441 | A | * | 8/2000  | Allport ........................ 348/552      |
| 6,123,362 | A | * | 9/2000  | Squilla et al. ................. 283/67       |
| 6,147,742 | A | * | 11/2000 | Bell et al. ...................... 355/27     |
| 6,154,295 | A | * | 11/2000 | Fredlund et al. ............ 358/487          |
| 6,295,058 | B1| * | 9/2001  | Hsu et al. .................... 715/769       |
| 6,301,586 | B1| * | 10/2001 | Yang et al. ............... 707/104.1         |
| 6,317,757 | B1| * | 11/2001 | Sakamaki .................... 707/502         |
| 6,317,782 | B1| * | 11/2001 | Himmel et al. ............. 709/218           |
| 6,356,908 | B1| * | 3/2002  | Brown et al. ................. 707/10         |
| 6,396,500 | B1| * | 5/2002  | Qureshi et al. ............. 345/473          |
| 6,396,963 | B2| * | 5/2002  | Shaffer et al. .............. 382/305         |

(Continued)

OTHER PUBLICATIONS

HTML 4.01 Specification, W3C Proposed Recommendation, Aug. 24, 1999, ☐☐http://www.w3.org/TR/1999/PR-html40-19990824/ ☐☐Chapter 16.*
Pollack, "Resizing Images," http://www.pageresource.com/html/image4.htm Archived on Apr. 22, 1999.*
"HTML 4.0 Specification, W3C Recommendation," Dec. 18, 1997 http://www.w3.org/TR/REC-html40-971218/ Chapter 18☐☐.*

(Continued)

*Primary Examiner*—Stephen Hong
*Assistant Examiner*—Adam Queler
(74) *Attorney, Agent, or Firm*—Dreier LLP

(57) ABSTRACT

The present invention is a system and method for gathering disparate content from various sources including the Internet and broadcasting such content for display on a television receiver. The content is captured, rendered, and placed into predetermined templates to create pages, and the pages are organized into an album of pages which are displayed in a loop, predefined sequence, or randomly. The album pages are encoded into a form that can be scheduled for broadcasting, and are transmitted to viewers for display on television receivers or similar devices.

33 Claims, 12 Drawing Sheets

U.S. PATENT DOCUMENTS

| | | | |
|---|---|---|---|
| 6,434,565 B1 * | 8/2002 | Berstis et al. | 707/101 |
| 6,453,078 B2 * | 9/2002 | Bubie et al. | 382/305 |
| 6,557,017 B1 * | 4/2003 | Venable | 715/502 |
| 6,725,421 B1 * | 4/2004 | Boucher et al. | 715/500.1 |
| 6,728,753 B1 * | 4/2004 | Parasnis et al. | 709/203 |
| 6,745,368 B1 * | 6/2004 | Boucher et al. | 715/500.1 |

OTHER PUBLICATIONS

HTML 4.01 Specification, W3C Proposed Recommendation, Aug. 24, 1999, "http://www.w3.org/TR/REC-html40-971218/present/frames.html" Chapter 16.*

International Search Report in regard to International Application No. PCT/US99/19028.

* cited by examiner

```
                                    ┌─312
TEMPLATE    SplashScreen {
    SLOT    Header
            LOCATION   http://local/SplashScreen.jpg
            HANDLER    jpgHandler.hdl
            RENDERER {
                    jpgSampleDown.rdr
                    jpgNTSCPixelize.rdr
            }
            DISPLAY    FULLSCREEN
    }
```

FIG. 11

```
TEMPLATE    InforScreen  {

SLOT  WelcomeBanner
          LOCATION    http://www.yshow.com/billac.jpg
          HANDLER     jpgHandler.hdl
          RENDERER    {
                jpgSampleDown.rdr
                jpgNTSCPixelize.rdr
                }
          DISPLAY     [<0,0>,<15, 15>]

SLOT  CurrentBill
          LOCATION    http://www.ysaturday.com/newsbill.txt
          HANDLER     txtHandler.hdl
          RENDERER    {
                txtSmoothFont.rdr
                }
          DISPLAY     [<15,0>,<30,15>]

SLOT  TitleTicker
          LOCATION    http://www.yshow.com/guide/titles.dat
          HANDLER     ticketHandler.hdl
          RENDERER    {
                ticketScrollSmall.rdr
                }
          DISPLAY     [<0,20>,<30,47>] REFRESH

SYSTEM AND METHOD FOR DISTRIBUTING INTERNET CONTENT IN THE FORM OF AN ALBUM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to patent application Ser. No. 08/991,349, titled System and Method for Distribution and Navigation of Internet Content, filed Dec. 16, 1997, now issued as U.S. Pat. No. 6,185,585, issued on Feb. 6, 2001, which is hereby incorporated by reference into this application in its entirety.

This application is related to patent application Ser. No. 09/137,618, titled System and Method for a Master Scheduler, filed Aug. 21, 1998, now pending issued as U.S. Pat. No. 6,222,530, issued on Apr. 24, 2001, which is hereby incorporated by reference into this application in its entirety.

BACKGROUND OF THE INVENTION

This invention relates to systems for presenting Internet content to television viewers. More particularly, the invention provides a system which captures unstructured information obtained from the Internet and other sources, organizes it, and prepares it for transmission to viewers' set-top boxes for display on standard television receivers.

There is an increasing synergy between television broadcasting and the Internet. Many broadcasters in the television industry support their own web sites where they post content relating to and supplementing their programming. For example, web sites for news or weather channels provide visitors with additional information not available in the broadcast program, such as reports specific to a region or interest or additional breaking reports. The broadcasters notify viewers of their web site address and encourage the viewers to visit their web site to obtain more information or participate in an interactive activity such as a survey relating to a program. There are also numerous web sites devoted to specific programs, such as those supported by fan organizations or individuals. Each site may have different information and may focus on different aspects of the program.

Viewers currently have several ways to take advantage of this synergy. One straightforward way is for the viewer to access the Internet over a personal computer and visit to the broadcaster's web site, without using or affecting the television receiver. This requires the viewer to break the continuity of the program and the viewing experience. Alternatively, systems such as WEBTV offer viewers the ability, among other things, to jump out to the world wide web while watching television, browse the web, and then return to watching television. Some systems may even provide the ability to continue watching a television program in a picture-in-picture type of representation, while accessing the web. Use of these types of systems requires special set top boxes and/or television receivers as well as additional input devices such as wireless keyboards.

The existing systems have several disadvantages. In all these cases, viewers are required to have additional systems to access the Internet while watching television. Viewers having only standard television receivers, even those connected to satellite or cable systems, are excluded. Moreover, the experience of accessing the Internet over the television is very similar to the traditional experience, requiring at least basic computer skills for navigating and interacting with the content. Many televisions viewers may still not have these basic skills and continue to be intimidated by computers. Further, the content accessed over the Internet is viewed in substantially the same form over the television as it is over the Internet. Since Internet content is often of lesser quality than television programming with respect to both video and audio, this creates a sharp, noticeable contrast between the two types of experiences.

Yet another disadvantage with existing systems is that the broadcaster does not have control over how the information is presented to a viewer. Although simply offering access to web pages may provide some limited benefit to broadcasters, broadcasters may prefer to retain greater control over the quality and content in the web pages, particularly those offered by third parties such as fan organizations. A broadcaster may also desire to integrate several web sites into a single page, and to control the sequence in which such content is viewed. Existing methods of such integration, such as using HTML frames, do not provide sufficient control over the material for a broadcaster nor do they allow broadcasters to transform such information or convert such information into a form that a broadcaster can use in traditional program scheduling.

There is thus a need for systems and techniques for capturing content from web sites and processing the content for presentation to all television viewers.

SUMMARY OF THE INVENTION

It is an object of the present invention to solve the problems described above associated with existing television and Internet access systems.

It is another object of the present invention to provide greater control and flexibility to broadcasters over how viewers experience Internet and other content.

It is another object of the present invention to allow broadcasters to present such content without having to invest in its creation.

It is another object of the present invention to convert Internet content to a form that is more familiar to broadcasters and that will work in the traditional broadcasting paradigm, including in existing television scheduling and interstitial systems.

It is another object of the present invention to provide access to Internet content to all television viewers, even those without computers or other special hardware.

It is another object of the present invention to make the experience of viewing Internet content more similar to traditional television viewing.

These and other objects are provided by a method and system for organizing content available from a plurality of locations for presentation to viewers. In accordance with one aspect of the invention, the method results in the generation of a web album, a collection of pages representing content consolidated by a broadcaster from the world wide web or other sources and transformed into a form and format that the broadcaster chooses for broadcasting to television viewers.

The method involves creating and storing a plurality of templates each identifying one or more locations at which content is available and one or more transformation techniques to be applied to the content. The locations may be web sites addresses, typically called uniform resource locators or URLs, as well as other locations at which content is stored, such as local hard or optical disks. The content is captured from the locations specified in each template and, in some embodiments, stored in a single, locally accessible memory device.

The stored, captured content is transformed in accordance with the transformation technique specified in the template for that content. Such transformation technique or rendering is performed according to a rendering program or module selected from a library of rendering programs stored locally or remotely. Alternatively, the same or additional transformations may be performed before the captured content is stored. The transformed content is inserted into the templates to thereby create a set of content pages for the album. The album pages are then preferably encoded into a form suitable for distribution to television viewers, such as into NTSC or MPEG form.

The album pages are then distributed to viewers such as by broadcasting for a duration and in an order set in an album data structure. Exemplary orders may be a loop, in which the pages are presented in a designated sequence and then continuously repeated in cyclical fashion, a random order, a single series, etc.

In some embodiments, the templates have slots, identified by coordinates on a screen display, into which captured content is to be inserted. As necessary, any item of content is resized in order to fit into its respective slot in the template. In addition, the templates may specify whether the content needs to be refreshed before creation of the page, that is, that the system must continuously retrieve new data from its location and not rely on the locally stored captured content. This feature may be used for content containing real-time data such as stock quotes and sports news.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 11 and 12 show sample template data files for the templates shown in FIG. 9 and referenced in the sample album data file shown in FIG. 10.

DETAILED DESCRIPTION OF THE PREFERRED EMBODIMENTS

Figure 1:
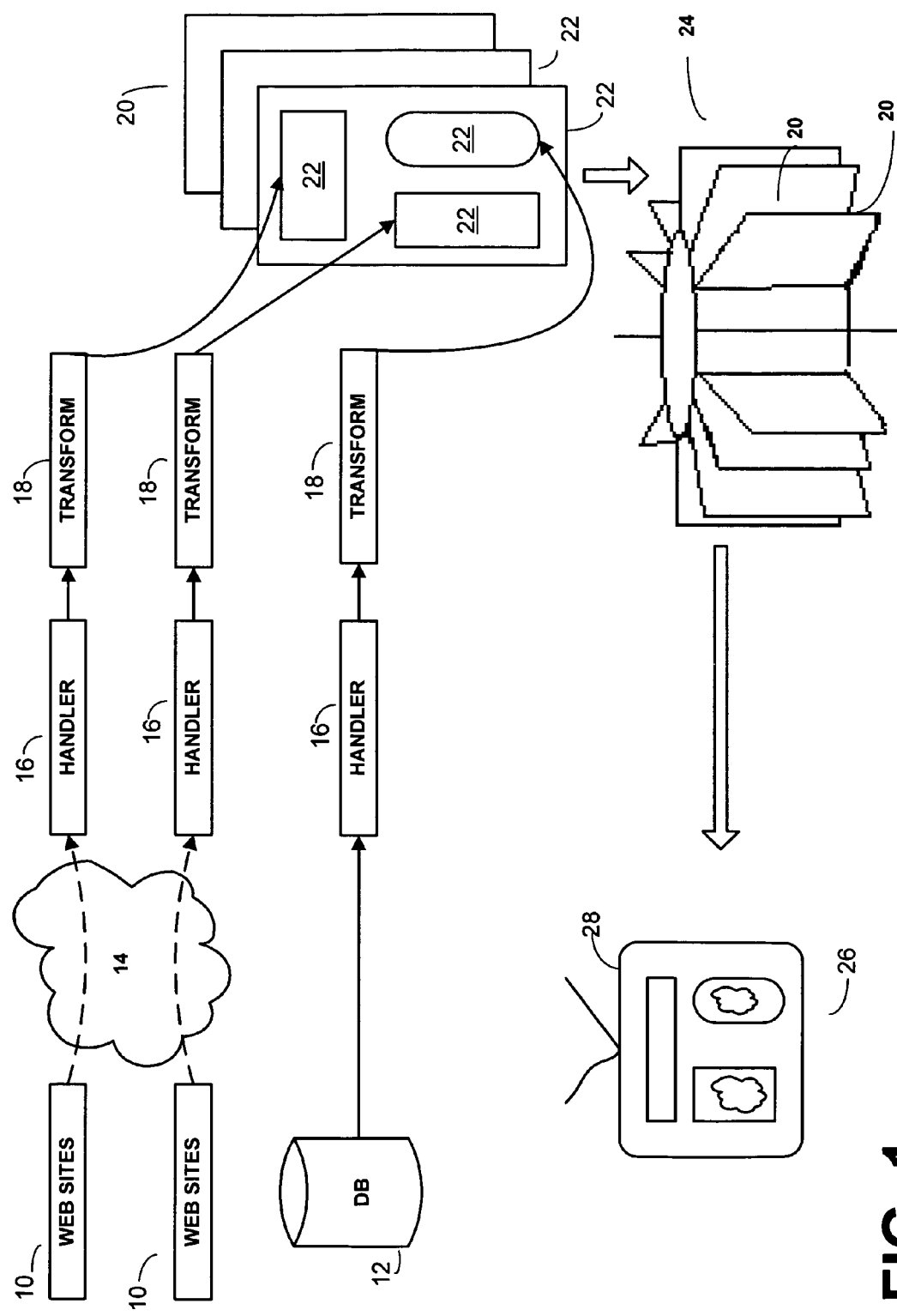
FIG. 1 is a data flow diagram representing the capture and processing of content for presentation to television viewers in accordance with the present invention.

Preferred embodiments of the invention are now described with reference to the drawings in the figures. The conceptual underpinnings of the invention are illustrated in the data flow diagram of FIG. 1. As shown in FIG. 1, content is stored on web sites 10 and in databases 12, which may be locally or remotely accessible. The content is retrieved from these locations, such as over the Internet 14 or other wired or wireless local or wide area network, or via any other conventional telecommunication system such as satellite, microwave, or other, and handled by handlers 16. A number of handlers 16 are used depending upon the data formats of the content, as described more fully below. The content is then rendered or transformed by transform programs 18 from its form as available from the web sites 10 or databases 12 to a more desirable form for presentation to viewers.

The transformed content is then inserted into a number of templates 20, each having one or more slots 22 into which specific content is to be inserted. The templates 20 are data structures which store the locations of the content to be inserted therein, and the handler programs 16 and rendering programs 18 which are to be used in the capturing and processing of the content. Each template 20 thus specifies the placement of a number of elements, or assets, on a page and how to handle each of the elements. An element may, for example, be a web page, graphic, sound, data (multimedia or otherwise), or even an application, such as a stock ticker application. FIG. 1 shows a template 20 having three slots 22. Each slot contains an element described in a template specification.

The templates 20 are arranged in an album data structure or specification 24 according to a defined sequence. An album is a collection of one or more album pages, and the album specification 24 details the collection of templates used to generate an album. The album pages are transmitted to viewers 26 by a transmission system for display in the defined sequence on their television receivers 28. The album data structure 24 also specifies the duration for which each template 20 is to be displayed.

Figure 2:
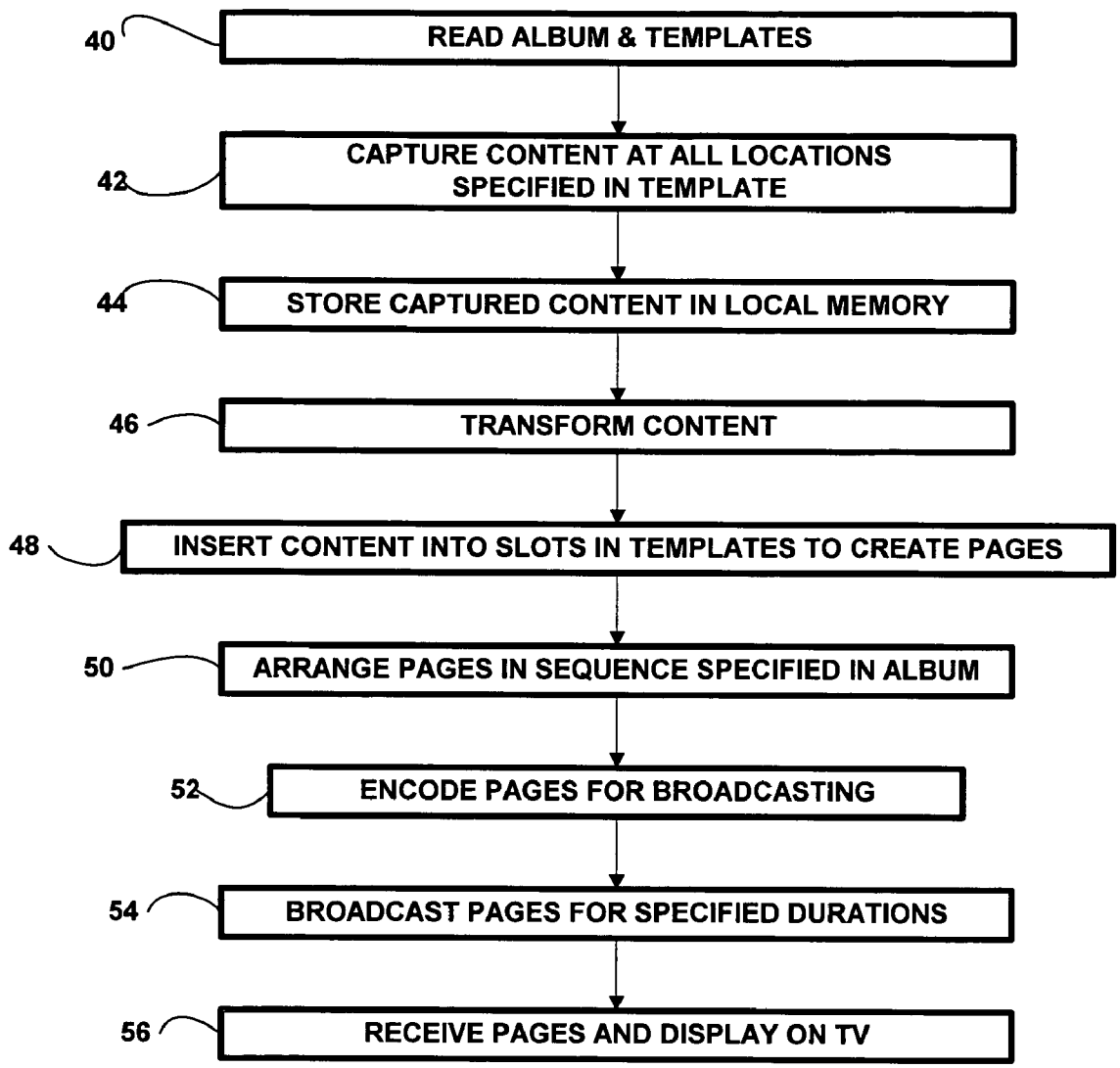
FIG. 2 is a flow chart showing an exemplary process of capturing and processing content in accordance with the present invention.

A process for supporting this data flow is shown in FIG. 2. The album and template data structures are read, step 40. Content identified in the templates in the album is then captured from all the locations specified in the templates, step 42. The captured content is stored in a memory device local to the transmission system, step 44. The content is transformed by the transform programs identified in the templates, step 46, and inserted into the templates, step 48, to thereby create a set of album or content pages. The pages are then arranged into a sequence defined in the album, step 50, and encoded into a proper desired format for broadcasting, step 52. The album pages are then broadcast for time durations specified in the album, step 54. The broadcast pages are received by television receivers, set top boxes, personal computers with tuner cards, or other similar devices, and displayed to viewers, step 56.

Figure 3:
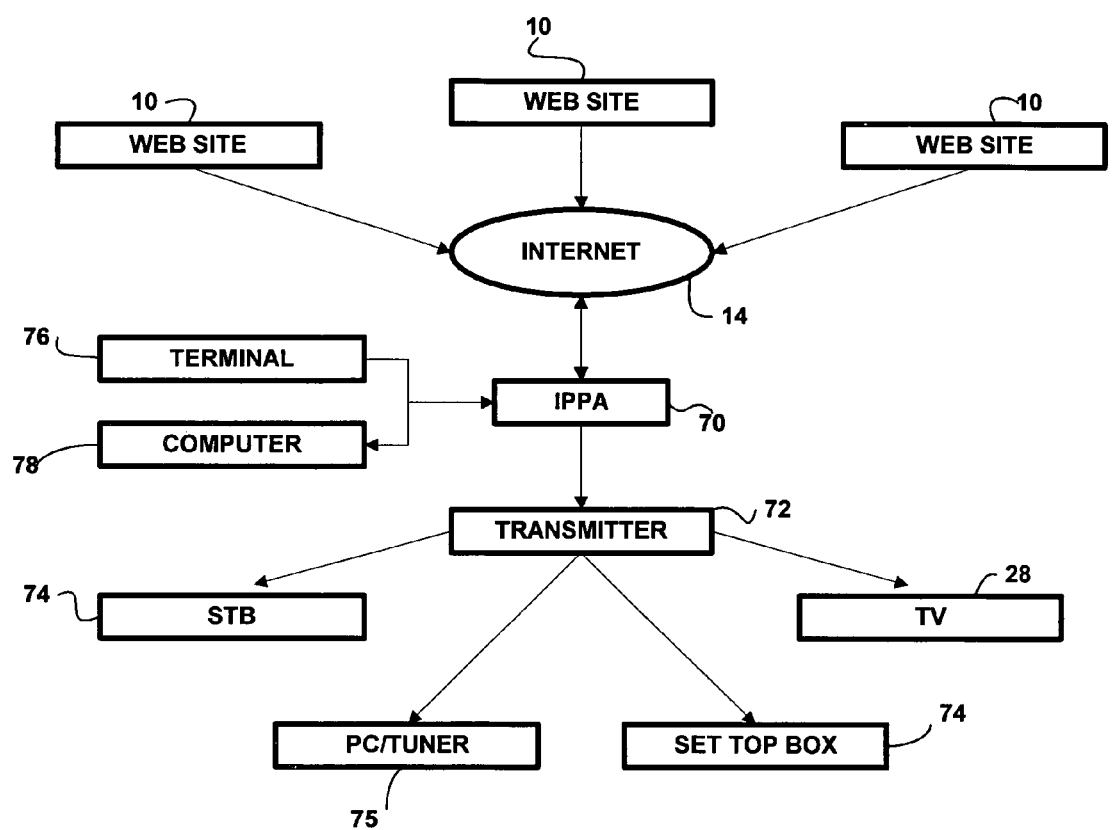
FIG. 3 is a block diagram of an exemplary embodiment of a system for capturing and processing content in accordance with the present invention.

Referring now to FIG. 3, there is shown a high level block diagram of a system practicing one aspect of the invention. In particular, an Internet Push Pull Agent ("IPPA") 70 is connected to the Internet 14 to retrieve content from web sites 10. IPPA 70 processes the materials retrieved from web sites 13 using a template to create an album page which may, for instance, consolidate content from different web sites. The resulting web album is then provided to transmitter 72 in a form or forms suitable for transmission to set top boxes ("STB") 74, television receivers 28, and personal computers equipped with tuner cards 75. As described herein, the album pages are preferably encoded at least into NTSC form for display on conventional TVs 28 without the need for further processing. STBs 74 and PCs 75 can process data sent by the transmitter 72, render the image represented by such data, and display the image for viewing.

IPPA 70 is controlled in a number of ways. For instance, as shown in FIG. 3, a terminal 76 may be used to provide instructions to IPPA 70. Such terminal 76 may be local to IPPA 70, that is, connected directly to IPPA 70, or terminal 76 may be a remote terminal that is connected to IPPA 70 via a wired or wireless network, cable, telephone line or other means of interconnection. In one embodiment, IPPA 70 also receives instructions from a remote system, shown in FIG. 3 as a computer system 78. The remote system may be a master scheduling system as described in co-pending patent application Ser. No. 09/137,618, filed Aug. 28, 1998, which has been incorporated herein by reference. That patent application describes a master scheduler which sends tasks or instructions to different media servers. In this embodiment, IPPA 70 acts as a media server and is controlled by the master scheduler as described in the aforementioned patent application.

Although the embodiment of the present invention illustrated in FIG. 3 uses the Internet, the invention is applicable to other types of networks, including intranets and extranets. Moreover, transmitter 72 can transmit data to STBs 74, TVs 28, and PCs 75 in a number of ways known to one skilled in the art. For instance, the transmission can be over cable or over networks, such as wireless satellite networks or cable networks, and can be in an analog or digital domain.

Figure 4:
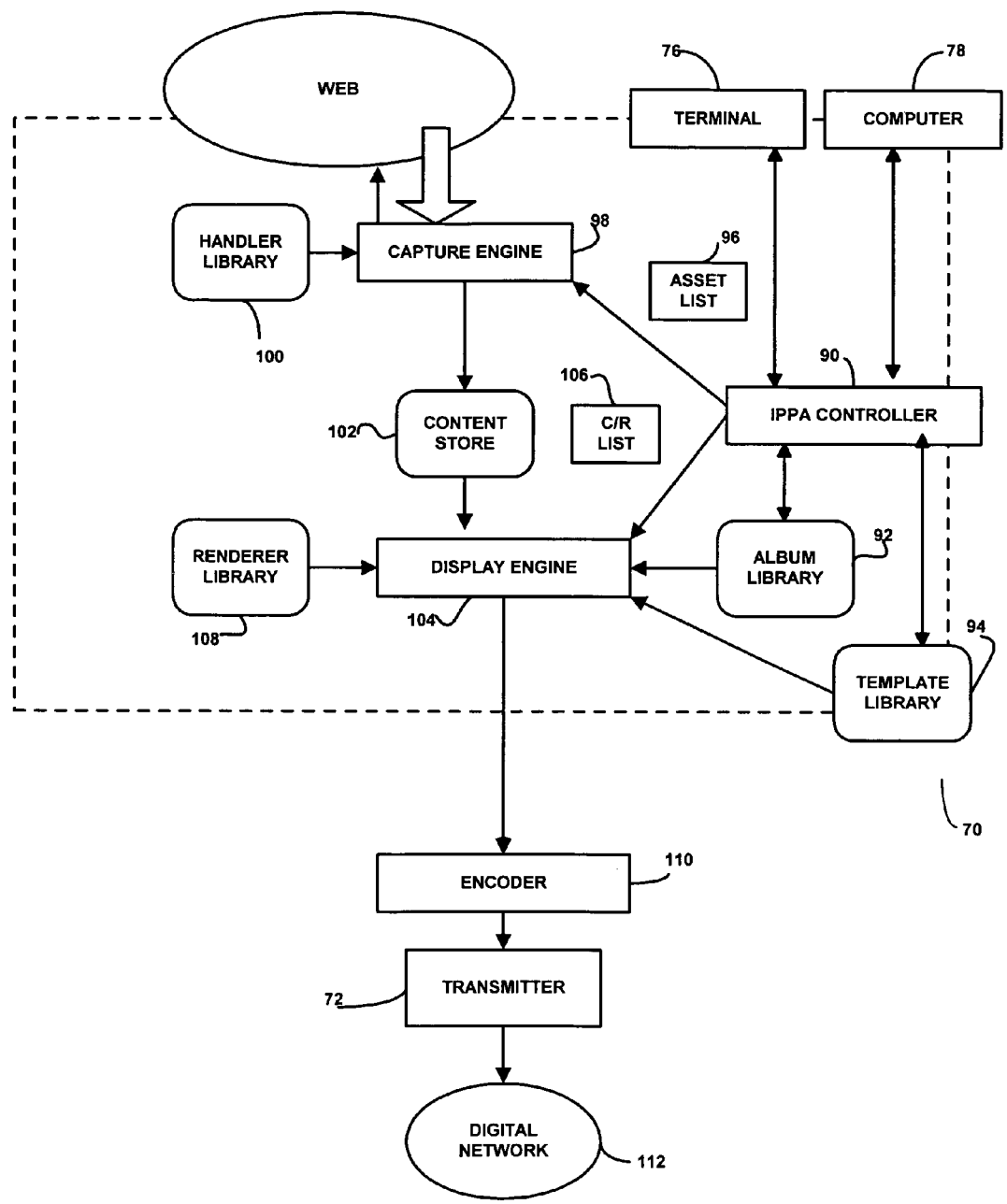
FIG. 4 is a block diagram of one embodiment of an Internet Push Pull Agent of the system of FIG. 3.

FIG. 4 shows IPPA 70 in greater detail. An IPPA Controller 90 interacts with terminal 76 and/or computer system 78 to receive instructions. Such instructions includes data, specifications, or pointers to files containing such data or specifications. In some embodiments, IPPA Controller 90 retrieves several specification files, including album specification files, stored in an Album Library 92, and template specification files stored in a Template Library 94.

IPPA Controller 90 processes the album and template specifications and generates an asset list 96. The asset list 96 contains information which includes the location of the elements for an album and the format of each element. IPPA Controller 90 then provides the asset list 96 to a Capture Engine 98. In one embodiment, the asset list 96 is generated and then provided to Capture Engine 98, however, the invention is not limited to providing a full asset list 96 and in an alternative embodiment, IPPA Controller 90 provides Capture Engine 98 with asset list data as it is generated to allow Capture Engine 98 to begin operations prior to IPPA Controller 90 completing such generation.

Capture Engine 98 retrieves an element from the location specified in the asset list 96. In one embodiment, the element is located on a server and is accessible via a network. FIG. 4 shows one embodiment where Capture Engine 98 retrieves the elements from a web site on the Internet. However, as described above, the invention is not limited to retrieving data over the Internet, and data may be retrieved from other storage media, such as CD-ROM towers, computers, or other devices accessible locally or on a network.

Capture Engine 98 uses a handler for each type of element to be retrieved. A handler is a device or software routine designed to interact with a specific type of element and, in some cases, transform the element into a form useful for other purposes. For example, a JPEG handler is used to interpret JPEG formatted content, and GIF, Text, HTML and WAV handlers are used to interpret GIF graphic files, text files, HTML files and WAV audio files, respectively. Some handlers may be used to convert the content into a uniform desired format prior to storage. For example, a REAL NETWORKS audio player could be used as a handler to play Real Audio music files for conversion to a video and audio format such as MPEG. These handlers are stored in a Handler Library 100. Capture Engine 98 interacts with Handler Library 100 to retrieve or activate the appropriate handler for each element it retrieves. Once retrieved, Capture Engine 98 stores the retrieved element in a Content Store 102, which may be any type of storage device, such as a hard disk, RAM, table, RW/CD-ROM or even a network server.

The IPPA 70 also contains a Display Engine 104. IPPA Controller 90 interacts with the Display Engine 104 by providing it with another asset list 106. The information provided in this asset list 106 includes the name of the album from Album Library 92 to display. Display Engine 104 retrieves the specified album, the templates specified in the album, retrieves the elements stored in Content Store 102 for each template and applies the appropriate renderer to the element. In rendering an element, Display Engine 104 retrieves or activates the appropriate renderer stored in a Renderer Library 108. Rendering applies a transformation to an element. This transformation allows a broadcaster to apply specific transformation or processing to the element for display to a viewer. For instance, a web page comprised of text from an advertiser can be mapped onto a three-dimensional logo of the advertiser with an appropriate renderer. Another example would be the transformation of a two-dimensional graphic illustrating the current global weather pattern from a web site onto a three-dimensional sphere of the Earth. In this manner the Display Engine 104 creates an album page using the rendered elements in accordance with the specification from the template. The album pages are then ordered as specified in the album, as described in greater detail below, and treated as an album.

Once the album is created, Display Engine sends each page to an Encoder 110. The Encoder 110 inputs the album page and outputs the page in a form suitable for broadcasting. For instance, Encoder 110 may take the album page and output it in NTSC format. This is a standard broadcasting format and thus the output could easily be fed into other standard broadcasting equipment. In one embodiment, IPPA 70 is a media server and the output of Encoder 110 is fed into the transmitter 72, which in turn transmits through a network 112 and/or over the airwaves. In one embodiment, the transmitter 72 sends such data via a Digital Network 112 to STBs 74 (FIG. 3). Of course, other types of network, such as a cable, fiber optic, satellite, or microwave networks, may be used and are well-known by those skilled in the art.

Figure 5:
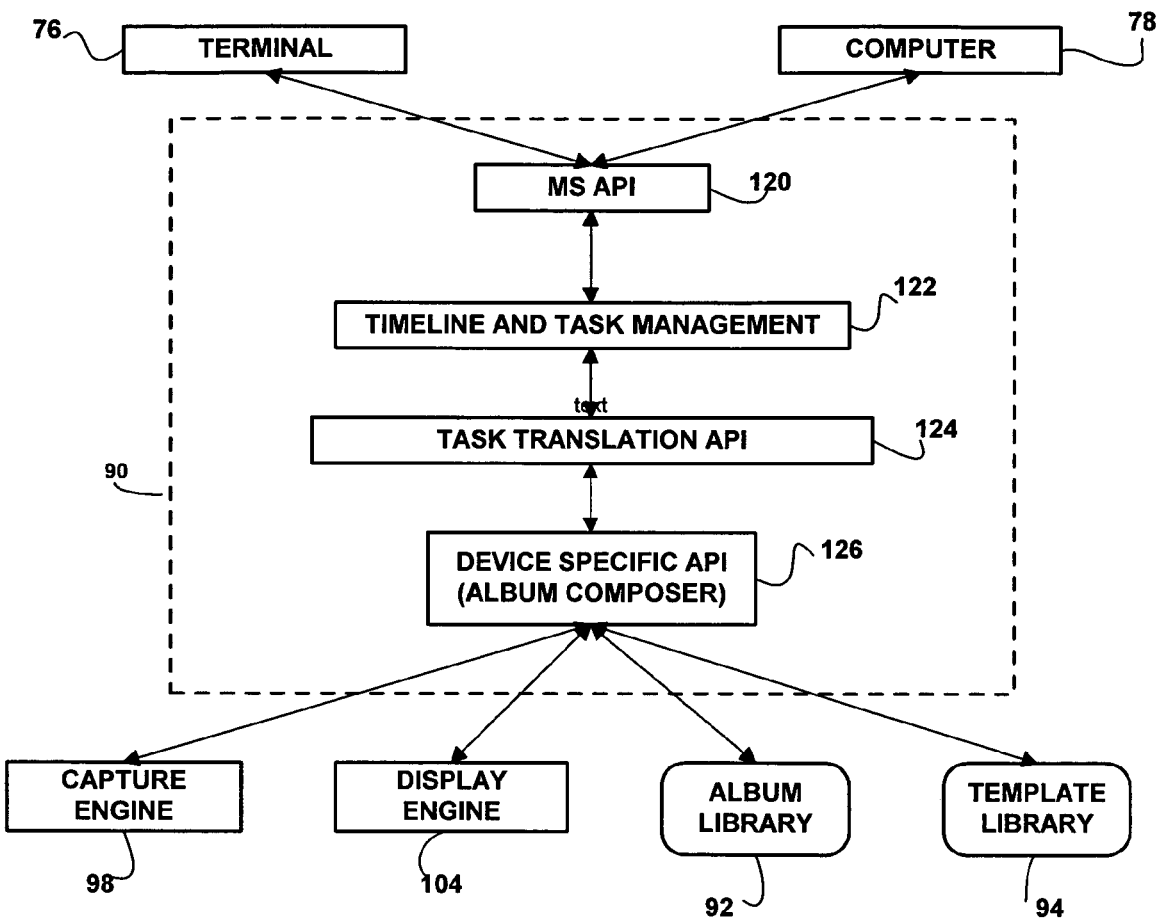
FIG. 5 is a block diagram of one embodiment of a controller for the Internet Push Pull Agent shown in FIG. 4.

Reference is now made to FIG. 5 which shows an embodiment of IPPA Controller 90. In this embodiment, IPPA Controller 90 contains a Master/Slave API 120, a Timeline and Task Management module 122, a Task Translation API 124, and a Device Specific API 126. A more detailed description of these units is provided in the aforementioned patent application, incorporated herein by reference.

In operation, instructions are sent to IPPA Controller 90 via the terminal 76 or computer system 78. In one embodiment, these instructions are called "tasks", which are a series of high-level instructions, such as "Play" issued by a master scheduler residing in computer system 78, to initiate a sequence of events, usually the retrieval and output of data for transmission to a viewer. The task is received by the Master Scheduler API 120 from computer system 78. Timeline and Task Management module 122 schedules the task for execution at the specified time. When the specified time occurs, Task Translation API 124 translates the task into a form understood by the Device Specific API 126, sometimes referred to herein as an Album Composer.

Album Composer 126 takes the data specified by the task and retrieves the specified album from Album Library 92. It also retrieves, as needed, the appropriate template from Template Library 94. From these files, Album Composer 126 creates the asset lists to transfer to Capture Engine 98 and Display Engine 104, according to a process described in greater detail below.

Figure 6:
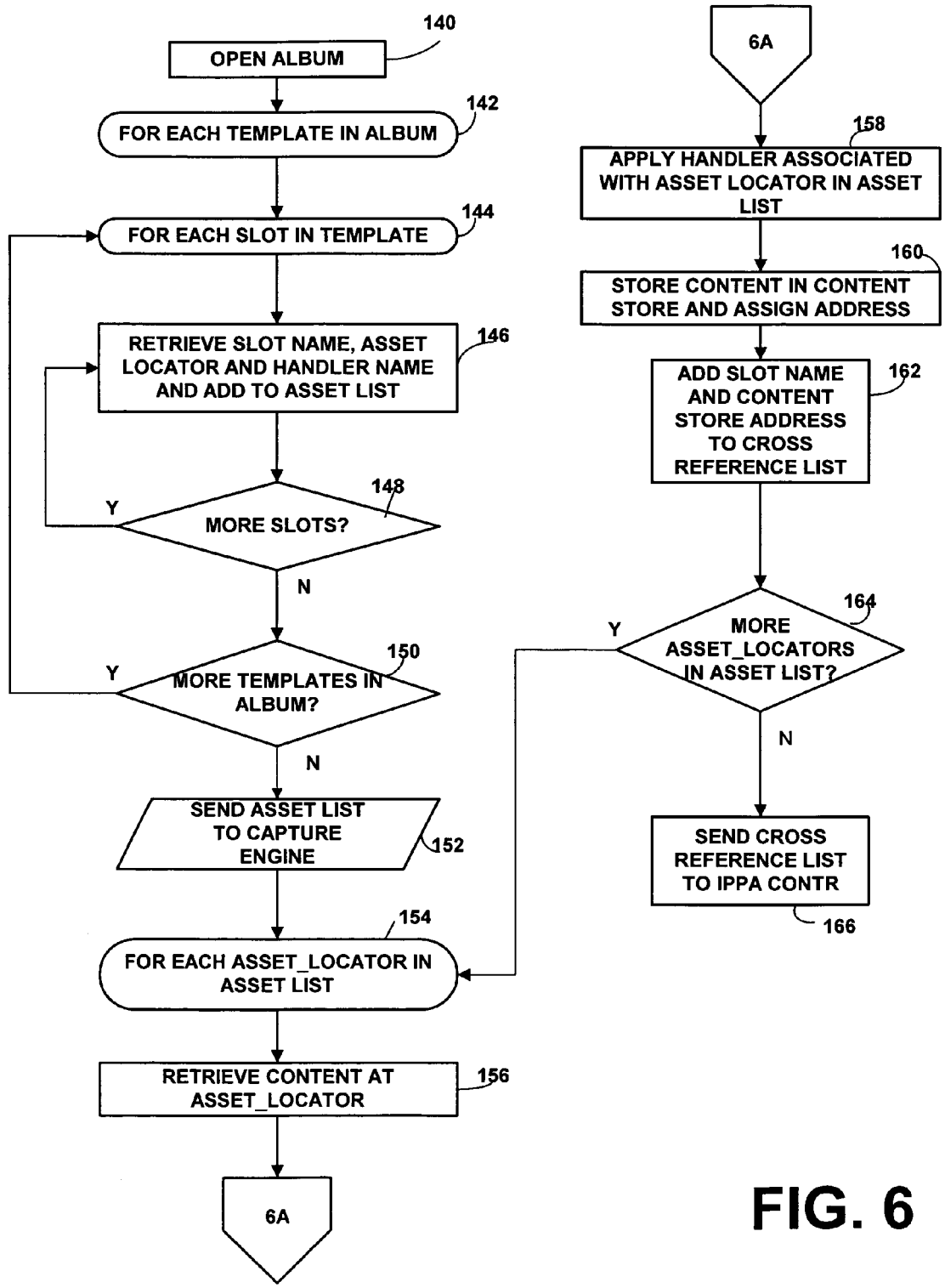
FIG. 6 is a flow chart showing in greater detail one embodiment of a process for capturing content from various locations.
Figure 7:
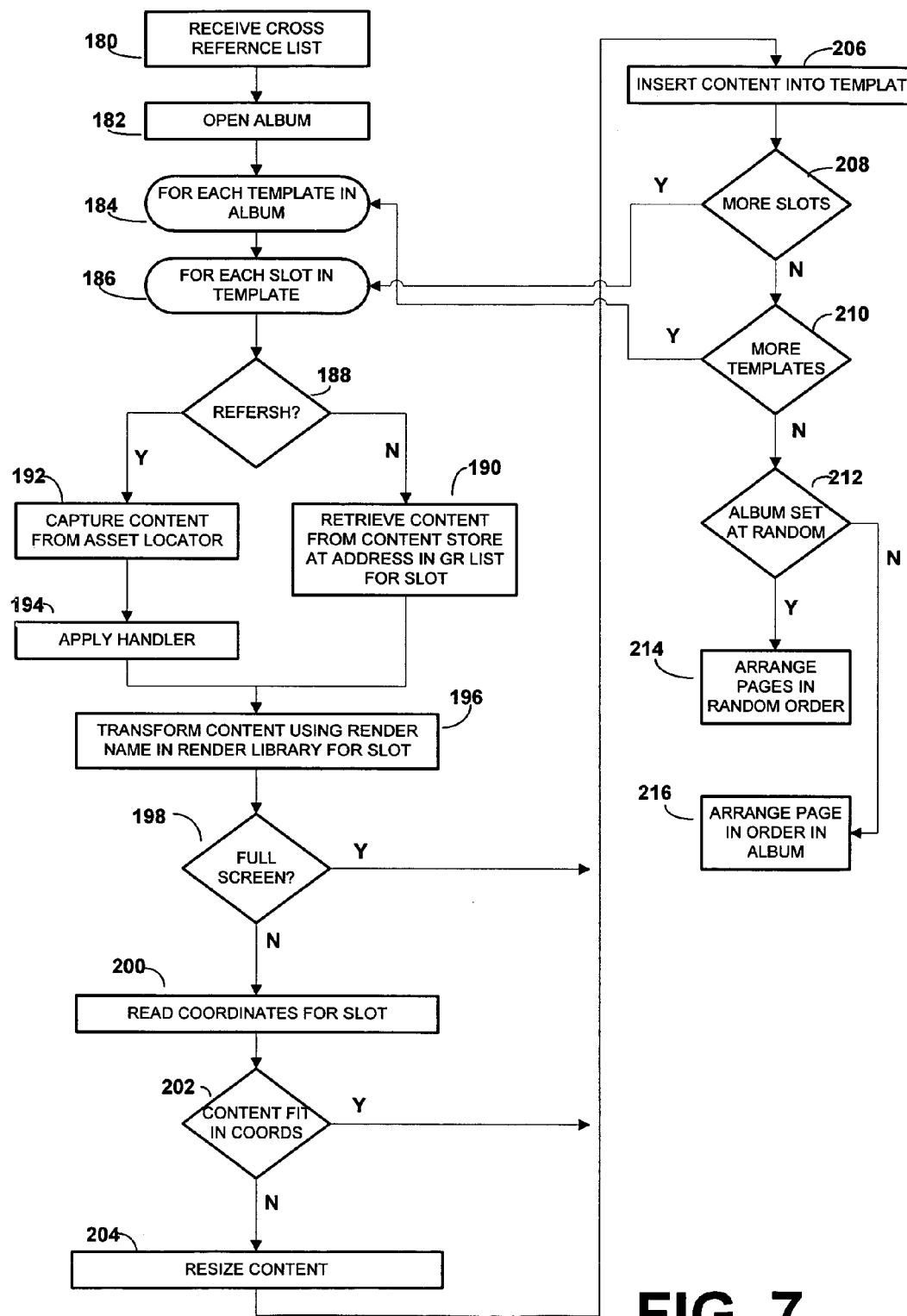
FIG. 7 is a flow chart showing in greater detail one embodiment of a process for generating content pages in an album from captured content.
Figure 8:
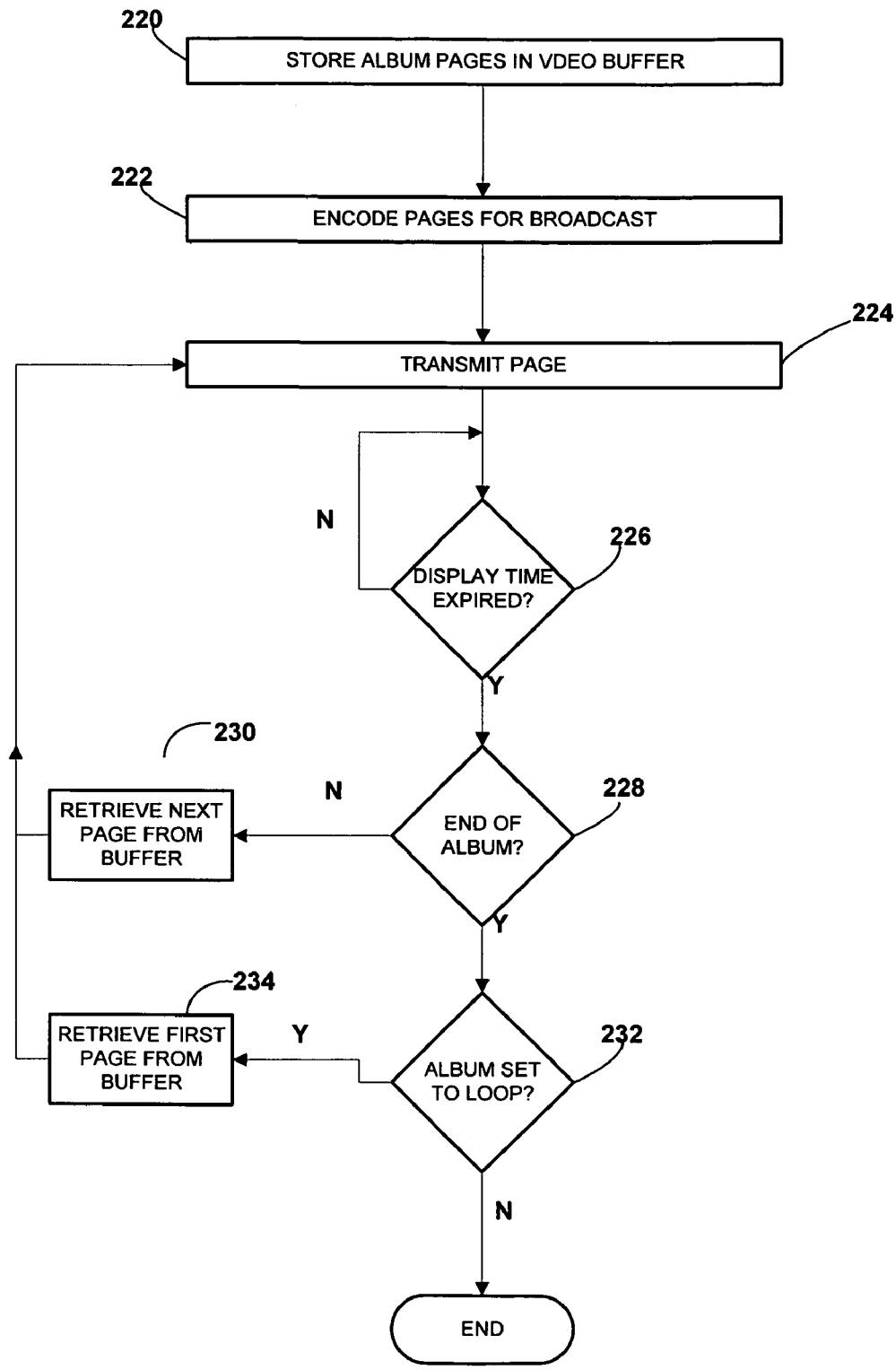
FIG. 8 is a flow chart showing in greater detail one embodiment of a process for transmitting content pages to viewers.

Reference is now made to Tables I and II, below, which provide an exemplary syntax specification for an album and template, respectively, in accordance with one embodiment of the invention. FIGS. 6–8 are then referenced to describe the operation of the various components shown in FIGS. 3–5 on the album and templates. The words in full capitalization in the tables are tokens used by Album Composer 126 in processing the specification files. A more detailed description of each of the tokens is given following each table.

TABLE I

```
ALBUM < album name > '{'
    (TEMPLATE <template_name>.tmpl DURATION
    <time_in_secs> ) +
    ('}'
    OR '}' LOOP
    OR '}'RANDOM
    OR '}'SEQUENCE
)
```

ALBUM: Indicates that the following parameter <album_name> is the name of the album.

TEMPLATE: Indicates that the following parameter <template_name> is the name of the template.

DURATION: Indicates that the following parameter <time_in_secs> specifies the duration for displaying the album page.

LOOP/RANDOM/SEQUENCE: Specifies that the album pages should be either continuously displayed in order in a loop, displayed in random order, or displayed once in the specified order, respectively.

TABLE II

```
TEMPLATE <template_name> '{'
    (SLOT <slot_name> <asset_locator>
        HANDLER <handler_name>.hlr
        RENDERER '{' (<render_name>.rdr)* '}'
        DISPLAY ( <coordinate_vector>
        OR <coordinate_vector>
        OR FULLSCREEN
        OR FULLSCREEN REFRESH
    ) +
    ('}'
    OR '}' REFRESH
)
```

TEMPLATE: Indicates that the following parameter <template_name> is the name of the template.

SLOT: Indicates that the following parameter <slot_name> refers to an identifier representing a slot on an album page. The parameter <asset_locator> is the location of the asset for the associated slot. The location can be the local to the system or over the Internet. In some embodiments, the asset_locator follows the syntax of a URL since many of the assets will be located on the Internet.

HANDLER: Indicates that the following parameter <handler_name> refers to the specific handler to be used to retrieve the specified asset.

RENDERER: Indicates that the following parameter <render_name> refers to the specific renderer to be applied to the retrieved asset.

DISPLAY: Indicates that the following parameter <coordinate> is the location of the slot on the album page. The coordinate system can be a Cartesian, polar or any other suitable type of coordinate system.

REFRESH: Specifies that the asset in the slot is refreshed, that is the asset is to be retrieved using the appropriate handler and the specified renderers applied each time the album page is to be displayed.

FULLSCREEN: Specifies that the asset in the slot is to be displayed in a full-screen format, preferably for a television audience no larger than 640×480 pixels.

FULLSCREEN REFRESH: Same as REFRESH, except that the asset is to be displayed in a fullscreen.

The process of capturing content as performed by the system of FIGS. 3–5 on files having this syntax is shown in FIG. 6. The IPPA Controller 90 opens a selected album specification, step 140. The IPPA Controller 90 then reads the album file and opens each template specification listed therein, step 142. In each template, the IPPA Controller 90 locates each slot, step 144. It then retrieves the slot name, asset locator and handler name and adds these three items as an entry in an asset list 96, step 146. If there are no more slots in the template, step 148, the process continues for the next template in the album. If there are no more templates, step 150, the asset list 96 is complete, and the IPPA Controller 90 sends it to the Capture Engine 98, step 152.

The Capture Engine 98 receives the asset list and reads it to find each asset locator, step 154. The Capture Engine 98 retrieves the content located at each asset locator, step 156, and applies the handler routine listed in the asset list entry with the asset locator, step 158. The retrieved content is then stored in the Content Store 102 at an assigned location, step 160. The Capture Engine then generates a second asset list, sometimes referred to herein as a cross reference list 106, by adding the slot name and assigned address in the Content Store 102 for each item of retrieved content, step 162. This process is repeated for all asset locators in the asset list 96. When all asset locators have been processed by the Capture Engine 98, step 164, the cross reference list is complete and sent to the IPPA Controller 90, step 166.

In alternative embodiments, the IPPA Controller 90 adds a refresh command or tag to the asset list for each slot specified for refresh in the templates, or otherwise generates a separate asset list for slots having refresh commands. In either case, the Capture Engine 98 establishes a refresh process for the slots designated for refresh, in which the Capture Engine 98 regularly recaptures the content from the source and updates the Content Store 102 with the refreshed content.

The capturing process may be repeated for a number of albums, with the captured content stored separately in Content Store 102 awaiting instructions or scheduling for broadcast.

The process of preparing an album for broadcast is described with reference to FIG. 7. When IPPA Controller 90 receives instructions or otherwise has a scheduling task whose time has arrived to display an album, it sends the cross reference list 106 to the Display Engine 104, which receives the list, step 180, and opens the album data structure, step 182. The Display Engine reads each template in the album, step 184, and each slot in each template, step 186. If the slot is not indicated for a refresh, using the syntax described above, step 188, the content listed in the cross reference list 106 is retrieved from Content Store 102 at the address indicated therein, step 190. If a refresh is indicated, the Display Engine 104 sends a message to IPPA Controller which then instructs the Capture Engine to capture the specified content using the asset locator, step 192, and to apply the handler routine specified in the template, step 194. As a result, the viewer may be presented with refreshed information each time the album page is presented.

As explained above, alternative procedures may be programmed for dealing with refresh commands. For example, as described above, content designated for refresh in the templates may be stored in a separate asset list containing scheduling data and periodically retrieved by the Capture Engine 98 at the scheduled time. The refreshed content may then be stored in the Content Store 102 so that the Display Engine 104 can retrieve the content directly from the Content Store 102 without the need to initiate a recapture of the content from its source. Other schemes may be designed according to the needs and parameters of a given system implementing the present invention.

Next, the retrieved content is transformed using the rendering routine specified in the template for the given slot, 196. Exemplary rendering routines include RGB-to-NTSC palette conversion, audio playback for conversion to MPEG, and anti-aliasing routines. The rendered content is then ready to be inserted into the template to create a page. If the template has a single slot and is designated as full screen, step 198, the content becomes the entire page. Otherwise, the Display Engine 104 reads the coordinates specified for the slot, step 200, determines the size of the slot from the coordinates, and determines whether the content fits into the slot, step 202. If not, the Display Engine resizes the content to fit, step 204, by enlarging it, shrinking it, and/or reshaping it, as necessary. The content is then inserted into the template, step 206. If there are more slots in the template, step 208, the process of retrieving content is repeated. Otherwise, the template has been successfully converted into an album page. If there are more templates in the album, step 210, this process of creating pages is repeated until all templates in the album have been converted to pages.

If the album specification contains a RANDOM setting, step 212, the completed pages are arranged in a random order, step 214. Otherwise, the album pages are arranged in an order corresponding to their order in the album specification, step 216. The completed pages so arranged thus constitute the album. Alternatively, the album pages may arranged in the order provided in the album specification and selected randomly just prior to transmission to viewers.

A process of broadcasting the album according to one embodiment is now described with reference to FIG. 8. The album pages are stored in a video buffer, step 220. The use of a video buffer page for each album page simplifies the design of Display Engine 104. First, album pages need only to be generated once, and not each time the album page is to be displayed. If the album is specified to loop through each album page, Display Engine 104 only needs to point to the start of each video buffer page. Second, Display Engine 104 only needs to update that portion of the video page that needs to be refreshed, like the ticker, and not the entire display.

Display Engine 104 transmits each album page to Encoder 110, which encodes the album page into a broadcast signal, step 222. This encoding provides a broadcaster with a signal such as an NTSC picture similar to that provided by other broadcast feeds. Aside from thus allowing the signal to be received by all standard television receivers, using this format allows the broadcaster to schedule the album as another video feed, including the ability to then schedule and insert interstitials or commercials.

Each page is broadcast for the time duration specified in the album, step 224. When the time expires, step 226, another page is selected for broadcast. If the current page is not the last page in the album, step 228, the next page is selected for transmission, step 230. When the last page is reached and the loop setting appears in the album, step 232, the first page in the album is retrieved for transmission, step 234, and the process repeated. If no loop is set, the album is finished, and another album may be scheduled for transmission.

Figure 9:
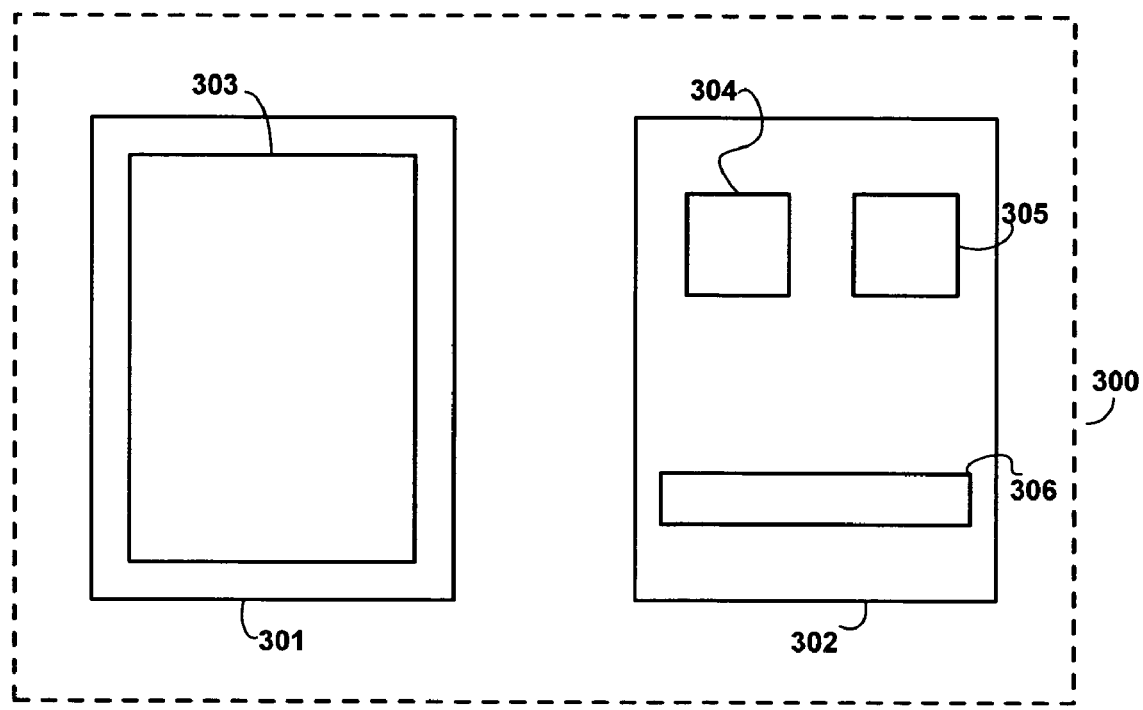
FIG. 9 illustrates an album containing exemplary templates.

FIGS. 9–12 illustrate an exemplary album and templates for purposes of providing a better understanding of the present invention. As shown in FIG. 9, exemplary album 300 consists of two album pages, shown as and represented by templates 301 and 302. Template 301 contains a single slot 303, which may, for instance, be a splash screen. Template 302 is an album page with three slots, slots 304, 305 and 306 to present information to a viewer.

Figure 10:
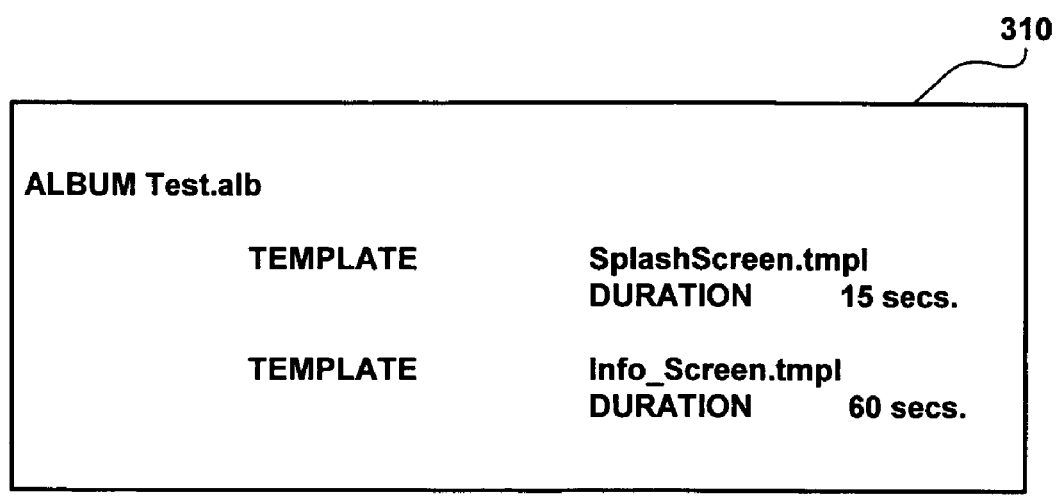
FIG. 10 shows a sample album data file.

FIG. 10 shows an exemplary album specification 310, stored as a text file in Album Library 92. Album specification 310 is identified by the name "Test". There are two templates used in album specification file 310, templates 301 and 302, referred to respectively as "SplashScreen.tmpl" and "InfoScreen.tmpl" respectively. The associated DURATION tokens specify that the album page generated by Template 301 is to be displayed to a viewer for 15 seconds and the album page generated by template 302 is to be displayed to a viewer for 60 seconds.

FIG. 11 shows an exemplary template specification 312 for template 301, stored as a text file in Template Library 94. Template Specification 312 defines template 301 as consisting of one slot named "Header". The slot contains a JPEG graphic format asset located on a local storage unit specified by "http://local/SplashScreenjpg". The handler to be used by Capture Engine 98 is a JPEG handler identified as "jpghandler.hid" and stored, in this example, in Handler Library 100. Two renderers are to be applied to the JPEG graphic in succession prior to display in an album page. The first renderer is identified as "jpgSampleDown.rdr" which, for illustrative purposes, samples down or reduces the resolution of the graphic file for display on a television screen. The sampled down JPG output file is then sent to the renderer identified as "jpgNTSCPixelize.rdr", which, for illustrative purposes, transforms and optimizes the sampled down graphic for an NTSC television display. The final NTSC optimized sampled down graphic is then to be displayed full screen in slot 303 on an album page in a form shown by template 301.

FIG. 12 shows an exemplary template specification 314 for template 302, stored as a text file in Template Library 94. Template specification 314 defines Template 302 as consisting of three slots, not including other material that may be present on the base album page between the slots, as "WelcomeBanner", "CurrentBill", and "TitleTicker".

The first slot, slot 304, is identified as "WelcomeBanner" and is a JPEG graphic located at "http://www.yshow.com/billacjpg". The may be a banner for a page that displays costs of pay-per-view shows for a particular day. Capture Engine 98 uses handler "jpgHandler.hdl" in Handler Library 100 to retrieve the graphic file. Display Engine 104 then applies two renderers to the graphic in succession, "jpgSampleDown.rdr" and "jpgNTSCPixelize.rdr". The output is to be displayed in slot 304 and the location of the banner is displayed in a square area bounded by the upper-left and corner at x-y coordinate (0, 0) and the lower-right corner at x-y coordinate (15, 15).

The second slot, slot 305, is identified as "CurrentBill" and is a text file located at "http://www.ysaturday.com/newsbill.txt". This file may be the list of prices for the pay-per-view shows. Capture Engine 98 uses handler "txtHandler.hdl" in Handler Library 100 to retrieve the text file. Display Engine 104 then applies renderer "txtSmoothFont.rdr", which for purposes of illustration, takes the text file and outputs a file contain the text but using a smooth font suitable for display on a television set. The output is to be displayed in slot 305 and the prices are displayed in a square area bounded by the upper-left corner at x-y coordinate (15, 0) and the lower-right corner at x-y coordinate (30, 15).

The third slot, slot 306, is identified as "TitleTicker" and is a data file located at "http://www.yshow.com/guide/titles.dat". The data file may, for instance, contain the titles and a short description of each of the pay-per-view shows. Capture Engine 98 uses handler "tickerHandler.hdi" in Handler Library 100 to retrieve the data file. Display Engine 104 then applies renderer "tickerScrollSmall.rdr", which for purposes of illustration, takes the ticker data file and outputs the data in a ticker form using a small font. The ticker of the show titles and descriptions is to be displayed in slot 306 and the location of the ticker is a rectangle area bounded by the upper-left corner at x-y coordinate (0, 20) and the lower-right corner at x-y coordinate (30, 47). The ticker is to be refreshed continuously.

Those skilled in the art will recognize that the syntax of the album and template shown is only one example and that another syntax may be used without departing from the scope of the claimed invention. Those skilled in the art will also recognize that different handlers and renderers may be used, and that the invention is not limited to that disclosed herein as an example.

In operation, as described above, IPPA Controller 90 uses album specification 310 and template specification 312 and 314 to generate the asset lists for Capture Engine 98 and Display Engine 104. For instance, IPPA Controller 90 may send to Capture Engine 98 as Asset List I the following three-tuples identifying each asset, its location and the handler to be used:

---
ASSET LIST 1
---

(SplashScreen, http://Iocal/SplashScreen.jpg, jpgHandler.hdl)
(WelcomeBanner, http://www.yshow.com/billac.jpg, jpgHandler.hdl)
(CurrentBill, http://www.ysaturday.com/newsbill.txt, txtHandler.hdl)
(TitleTicker, http://www.yshow.com/guide/titles.dat, tickerHandler.hdl)

---

Capture Engine 98 then retrieves each of the specified assets and stores them in Content Store 102. Once completed, Capture Engine 204 sends back as Cross Reference List 1 the location in Content Store 102 where each of the retrieved assets are stored. This information may returned to IPPA Controller 90 in the form of two-tuples such as:

---
CROSS REFERENCE LIST 1
---

(SplashScreen, http://content-store/ss.jpg)
(WelcomeBanner, http://content-store/wb.jpg)
(CurrentBill, http://content-store/cb.txt)
(TitleTicker, http://content-store/tt.dat)

---

In one embodiment, IPPA Controller 90 then sends to Display Engine 104 the name of the album file and Cross Reference List 1. Display Engine 104 retrieves the specified album file and generates each of the album pages as specified by SplashScreen.tmpl and InfoScreen.tmpl. Display Engine 104 also uses Cross Reference List 1 to retrieve the assets stored by Content Store 102, apply the renderers to the stored assets, and create each album page. Display Engine 104 then continuously transmits each album page for the duration specified in album specification 310 to Encoder 110.

In one embodiment Display Engine 104 builds a video buffer page for each album page. Each video buffer page is updated as needed. For example, the splash screen album page shown as template 301 only needs to be generated once. There is no updating of the information on that page. In contrast, the information album page shown as template 502 has static and active elements. The Welcome Banner and price list located in slots 304 and 305 only need to be generated once. However, the ticker in slot 306 will have to be continuously refreshed with new data to provide a moving ticker on the album page. Thus, Display Engine 104 must constantly update the video buffer page for this album page many times of the duration of display, which in the example is 60 seconds for each loop.

In the manner described above, the present invention thus provides a system and method to create albums from disparate sources for scheduling, transmission and display to viewers. While this invention has been described with reference to the preferred embodiments, other modifications will become apparent to those skilled in the art by study of the specification and drawings. It is thus intended that the following appended claims include such modifications as fall within the spirit and scope of the present invention.

What is claimed is:

1. A method for organizing content available from a plurality of locations for presentation to viewers, the method comprising:

storing a plurality of templates each identifying one or more locations at which content is available and one or more transformation techniques for transforming content for distribution to television viewers, said transformation techniques comprising external rendering routines, the location of said rendering routines defined for each location of content;

capturing the content from the one or more locations specified in each template;

transforming the captured content from each of the locations in accordance with the one or more transformation techniques specified in the templates;

inserting the transformed content into the templates to thereby create a set of content pages;

encoding the content pages into a video form for broadcasting the content pages to television viewers; and broadcasting the content pages to television viewers.

2. The method of claim 1, wherein a first template of the templates identifies a plurality of locations at which content is available and a plurality of slots within a screen display at which content from each location identified in the first template is to be inserted, and wherein the step of inserting the transformed content into the template comprises inserting the transformed content into the respective slots in the first template for the locations from which the content was captured.

3. The method of claim 2, comprising resizing the transformed content for insertion into the respective slots in the first template.

4. The method of claim 2, wherein the first template identifies the plurality of slots through coordinates on the screen display, and wherein the step of resizing the transformed content comprises determining a size for the content based upon the coordinates for the slot.

5. The method of claim 1, comprising storing an album data structure identifying the plurality of templates and containing sequence data specifying a presentation sequence for the templates.

6. The method of claim 5, wherein the step of broadcasting the content pages comprises broadcasting the content pages in accordance with the sequence data contained in the album data structure.

7. The method of claim 6, wherein the step of broadcasting the content pages comprises broadcasting the content pages in cyclical fashion.

8. The method of claim 6, wherein the step of broadcasting the content pages comprises broadcasting the content pages in random order.

9. The method of claim 6, where the step of broadcasting the content pages comprises broadcasting the content pages in a single predefined sequence.

10. The method of claim 5, wherein the album data structure further comprises duration data specifying a display time for each template contained therein, and wherein the step of broadcasting the content pages comprises broadcasting each content page for display to the viewers for the display time of the respective template.

11. The method of claim 1, wherein the step of capturing the content comprises generating a content asset list listing the locations identified in the plurality of templates, retrieving the content at each of the locations in the content asset list and storing the retrieved content in a memory device.

12. The method of claim 1, comprising broadcasting the content pages to viewers over a television channel.

13. The method of claim 1, wherein the plurality of locations include Internet sites, and wherein the step of capturing the content comprises retrieving content from the Internet sites.

14. The method of claim 13, wherein the plurality of locations include locally accessible storage media, and wherein the step of capturing the content comprises retrieving content from the storage media.

15. The method of claim 1, wherein the plurality of locations include remote storage media accessible over a network, and wherein the step of capturing the content comprises retrieving content from the storage media via the network.

16. A system for organizing content available from a plurality of locations for presentation to viewers, the system comprising:

a memory system storing a plurality of templates each identifying one or more locations at which content is available and one or more transformation techniques for transforming content for distribution to television viewers;

a capture engine for capturing the content from the one or more locations specified in each template;

a display engine for transforming the captured content from each of the locations in accordance with the one or more transformation techniques specified in the template, said transformation techniques comprising external rendering routines, the location of said rendering routines defined for each location of content, and for inserting the transformed content into the templates to thereby create a set of content pages;

a controller for retrieving the templates from the memory system and controlling operations of the capture and display engines; and an encoder for encoding the content pages into a video form for broadcasting television viewers.

17. The system of claim 16, comprising a transmission system for broadcasting the content pages to the viewers.

18. The system of claim 16, wherein the memory system further stores an album data structure identifying the templates and an ordering scheme for the templates.

19. A computer readable medium storing program code for when executed causing a computer to perform a method for organizing content available from a plurality of locations for presentation to viewers, the method comprising:

storing a plurality of templates each identifying one or more locations at which content is available and one or more transformation techniques for transforming content for distribution to television viewers, said transformation techniques comprising external rendering routines, the location of said rendering routines defined for each location of content;

capturing the content from the one or more locations specified in each template;

transforming the captured content from each of the locations in accordance with the one or more transformation techniques specified in the templates;

inserting the transformed content into the templates to thereby create a set of content pages which my be distributed to viewers; and encoding the content pages into a video form for broadcasting to television viewers.

20. A method for creating an Internet album comprising:

a. storing a plurality of templates each specifying one or more Internet sites, a slot for each Internet site adapted to hold content retrieved from the Internet site, and a transformation technique for transforming the content for distribution to television viewers, said transformation techniques comprising external rendering routines, the location of said rendering routines defined for each location of content;

b. for a given slot within a given template, retrieving content from the Internet site for the given slot;

c. applying the transformation technique to the retrieved content;

d. entering the transformed content into the given slot;

e. repeating steps b through d for each slot in each template to thereby create a plurality of album pages containing the content;

f. organizing the album pages into an Internet album in accordance with a defined ordering scheme; and g. encoding the Internet album into a video form for broadcasting to television viewers.

21. A computer system for organizing content available from a plurality of locations for presentation to a viewer, the system comprising:
- a set of templates used to generate a set of corresponding content pages, each template identifying one or more locations at which content is available and one or more transformation techniques for transforming content for distribution to television viewers, said transformation techniques comprising external rendering routines, the location of said rendering routines defined for each location of content, to thereby generate a content page;
- an album data structure operative to store the set of templates according to a predefined sequence and deliver one or more content pages to a viewer according to the predefined sequence upon request; and
- an encoder for encoding the content pages into a video form for broadcasting television viewers.

22. The system of claim 21, wherein the album data structure comprises duration data specifying a display time for each content page contained therein.

23. The system of claim 21, wherein the content pages are distributed from the album data structure over a transmission system in a cyclical order.

24. The system of claim 21 wherein the content pages are distributed from the album data structure over a transmission system in random order.

25. The system of claim 21 comprising:
- a capture engine for capturing the content from the one or more locations specified in the set of templates; and
- a display engine for transforming the captured content from each of the locations in accordance with the one or more transformation techniques specified in the set of templates and for inserting the transformed content into the templates to thereby create the one or more content pages.

26. The system of claim 21 comprising a transmission system for distributing the content pages to viewers.

27. The system of claim 26 wherein the transmission system comprises a transmission system selected from one or more of the group comprising: over-the-air television transmission, cable television transmission, DBS transmission and the Internet.

28. A computerized system for organizing content available from a plurality of locations for presentation to a viewer via a transmission system, the system comprising:
- a set of templates stored in memory and used to generate a set of corresponding content pages, each template identifying one or more computerized locations at which content is available and one or more transformation techniques for transforming content for distribution to television viewers, said transformation techniques comprising external rendering routines, the location of said rendering routines defined for each location of content, to thereby generate a content page;
- a display engine for transforming the captured content from each of the locations in accordance with the one or more transformation techniques specified in the set of templates and for inserting the transformed content into templates to thereby create the one or more content pages;
- an album data structure operative to store the set of templates according to a predefined sequence and deliver one or more content pages to a viewer according to the predefined sequence, the album data structure also operative to specify a display time for each content pages; and
- an encoder for encoding the content pages into a video form for broadcasting television viewers.

29. The system of claim 28, wherein the content pages are distributed from the album data structure to a viewer upon request.

30. The system of claim 28, wherein the content pages are distributed from the album data structure over the transmission system in a cyclical order.

31. The system of claim 28, wherein the content pages are distributed from the album data structure over the transmission system in a random order.

32. The system of claim 28 wherein the transmission system comprises a transmission system selected from one or more of the group comprising: over-the-air television transmission, cable television transmission, DBS transmission and the Internet.

33. A method for organizing content available from a plurality of locations for presentation to viewers, the method comprising:
- storing a plurality of templates each identifying one or more locations at which content is available and one or more transformation techniques for transforming content for distribution to television viewers, said transformation techniques comprising external rendering routines, the location of said rendering routines defined for each location of content;
- capturing the content from the one or more locations specified in each template;
- transforming the captured content from each of the locations in accordance with the one or more transformation techniques specified in the templates;
- inserting the transformed content into the templates to thereby create a set of content pages; and
- encoding the content pages into a video form for continuously broadcasting each of the content pages to television viewers for a specified duration.

\* \* \* \* \*